United States Patent
Kobayashi

(10) Patent No.: US 11,417,083 B2
(45) Date of Patent: Aug. 16, 2022

(54) IMAGE PROCESSING APPARATUS

(71) Applicant: DENSO CORPORATION, Kariya (JP)

(72) Inventor: Kazuhiko Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 130 days.

(21) Appl. No.: 16/848,034

(22) Filed: Apr. 14, 2020

(65) Prior Publication Data

US 2020/0334488 A1    Oct. 22, 2020

(30) Foreign Application Priority Data

Apr. 16, 2019   (JP) .............................. JP2019-077812

(51) Int. Cl.
  *G06K 9/00*    (2022.01)
  *G06V 10/50*   (2022.01)
  *G06V 10/60*   (2022.01)
  *G06V 20/56*   (2022.01)

(52) U.S. Cl.
  CPC ............ *G06V 10/507* (2022.01); *G06V 10/60* (2022.01); *G06V 20/56* (2022.01)

(58) Field of Classification Search
  None
  See application file for complete search history.

(56) References Cited

U.S. PATENT DOCUMENTS

| | | | | |
|---|---|---|---|---|
| 6,301,386 B1 * | 10/2001 | Zhu | ........................ | G06K 9/342 |
| | | | | 382/173 |
| 8,406,518 B2 * | 3/2013 | Kass | ........................ | G06T 7/44 |
| | | | | 382/168 |
| 8,478,064 B2 * | 7/2013 | Kass | ........................ | G06T 5/20 |
| | | | | 382/264 |
| 8,502,913 B2 * | 8/2013 | Nakayama | ......... | H04N 5/23245 |
| | | | | 348/364 |
| 9,117,139 B2 * | 8/2015 | Nakayama | ............. | H04N 5/235 |
| 10,721,448 B2 * | 7/2020 | El Dokor | ............... | G06V 10/60 |
| 2010/0310168 A1 * | 12/2010 | Kass | ........................ | G06T 7/44 |
| | | | | 382/168 |
| 2011/0157425 A1 * | 6/2011 | Nakayama | ........... | G06K 9/4647 |
| | | | | 348/234 |

(Continued)

FOREIGN PATENT DOCUMENTS

JP      2004191276 A  *  7/2004
JP         3747056 B2     2/2006

*Primary Examiner* — Feng Niu
(74) *Attorney, Agent, or Firm* — Maschoff Brennan

(57) ABSTRACT

In an image processing apparatus, an image obtaining unit obtains, from a vehicular camera, an image captured by the vehicular camera based on a predetermined imaging condition. An image processing unit executes an image-processing task of the image. A histogram generation unit generates a histogram based on the luminance values of the pixels included in the road-surface region in the image. The histogram graphically represents a frequency of each of the luminance values of the pixels included in the road-surface region in the image. A histogram determination unit determines whether the histogram has first and second separate crests. A change unit changes, upon determination that the histogram has first and second separate crests, at least one of 1. The imaging condition of the vehicular camera
2. The image-processing task to be executed by the image processing unit.

21 Claims, 7 Drawing Sheets

(56) References Cited

U.S. PATENT DOCUMENTS

| | | | |
|---|---|---|---|
| 2011/0229029 A1* | 9/2011 | Kass | G06T 5/002 |
| | | | 382/168 |
| 2012/0314094 A1* | 12/2012 | Shibata | H04N 5/23267 |
| | | | 348/208.6 |
| 2013/0300886 A1* | 11/2013 | Nakayama | H04N 5/23245 |
| | | | 348/216.1 |
| 2014/0267612 A1* | 9/2014 | El Dokor | H04N 5/2356 |
| | | | 348/46 |
| 2017/0116731 A1* | 4/2017 | Tsunomori | G06T 7/136 |

* cited by examiner

IMAGE PROCESSING APPARATUS

CROSS REFERENCE TO RELATED APPLICATION

This application is based on and claims the benefit of priority from Japanese Patent Application No. 2019-077812 filed on Apr. 16, 2019, the disclosure of which is incorporated in its entirety herein by reference.

TECHNICAL FIELD

The present disclosure relates to image processing apparatuses.

BACKGROUND

Road condition determination apparatuses obtain an image of a predetermined region of a road surface using a camera installed in a vehicle, and determine, based on the image, whether there is moisture on the road surface.

SUMMARY

An image processing apparatus according to a first exemplary aspect of the present disclosure includes a histogram generation unit that generates a histogram based on luminance values of pixels included in a road-surface region in an image. The histogram graphically represents a frequency of each of the luminance values of the pixels included in the road-surface region in the image. A histogram determination unit determines whether the histogram has first and second separate local crests. A change unit changes, upon determination that the histogram has first and second separate local crests, at least one of 1. The imaging condition of the vehicular camera
2. The image-processing task to be executed by the image-processing unit

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Viewpoint

Figure 1:
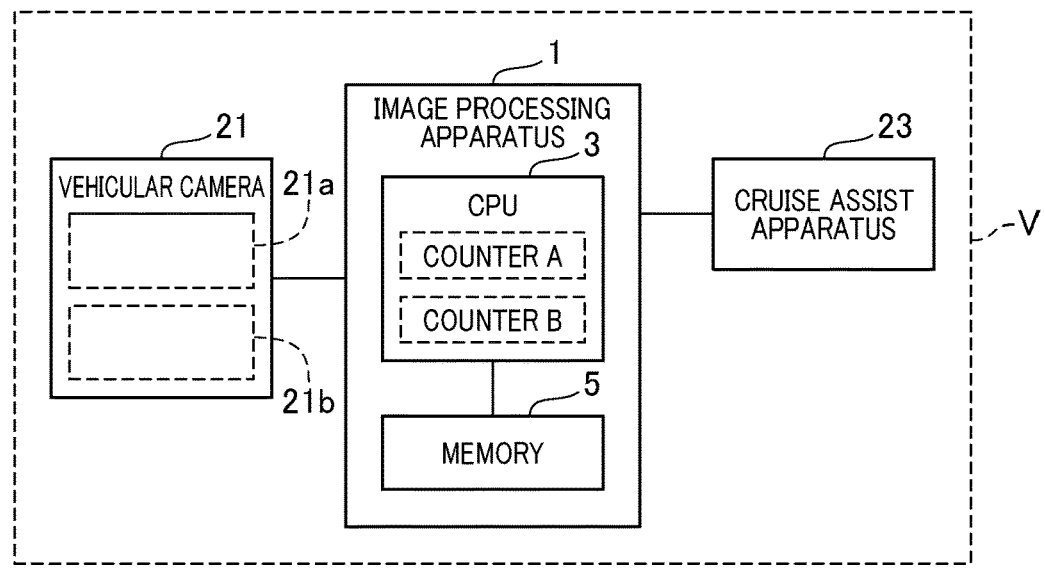
FIG. 1 is a block diagram schematically illustrating an example of the schematic structure of an image processing apparatus according to the first embodiment of the present disclosure.

An image processing apparatus is capable of performing at least one predetermined image-processing task of an image captured by a camera installed in a vehicle, which will be referred to as a vehicular camera. The characteristics of an image captured by a vehicular camera may vary depending on, for example, the environments around the corresponding vehicle.

Variation in the characteristics of an image captured by a vehicular camera may cause the at least one predetermined image-processing task of the captured image to be unsuitable for the characteristics of the captured image.

In addition, such a vehicular camera captures an image using at least one predetermined imaging condition. A variation in the characteristics of an image captured by such a vehicular camera may cause the at least one predetermined imaging condition to be unsuitable for the characteristics of the captured image.

In view of the circumstances set forth above, an exemplary aspect of the present disclosure seeks to provide image processing apparatuses, each of which is capable of changing at least one of 1. An image-processing task of an image to be executed by the image processing apparatus
2. An imaging condition of a next image to be captured in accordance with the characteristics of a previously captured image An image processing apparatus according to an exemplary aspect includes an image obtaining unit configured to obtain, from a vehicular camera, an image captured by the vehicular camera based on a predetermined imaging condition. The image is comprised of pixels each having a luminance level, and includes a road-surface region corresponding to a road surface. The image processing apparatus includes an image processing unit configured to execute an image-processing task of the image obtained by the image obtaining unit. The image processing apparatus includes a histogram generation unit configured to generate a histogram based on the luminance values of the pixels included in the road-surface region in the image, the histogram graphically representing a frequency of each of the luminance values of the pixels included in the road-surface region in the image. The image processing apparatus includes a histogram determination unit configured to determine whether the histogram has first and second separate local crests. The image processing apparatus includes a change unit configured to change, upon determination that the histogram has first and second separate crests, at least one of 1. The imaging condition of the vehicular camera
2. The image-processing task to be executed by the image processing unit If the histogram has first and second separate crests, the corresponding image is likely to be captured in a specific situation where the road surface is wet due to rain or another factor during night-time from dusk to dawn. The characteristics of the image captured in the specific situation are different from those of the image captured in another situation.

From this viewpoint, the change unit of the image processing apparatus is configured to change, upon determination that the histogram has first and second separate crests, at least one of 1. The imaging condition of the vehicular camera
2. The image-processing task to be executed by the image processing unit Changing of at last one of the imaging condition and the image-processing task to be executed by the image processing unit enables the image-processing task of the image to be carried out while being suitable for the characteristics of the image.

EMBODIMENT

According to the view point, the following describes exemplary embodiments of the present disclosure with reference to the accompanying drawings. In the exemplary embodiments and their modifications, like parts between the exemplary embodiments and their modifications are omitted or simplified to avoid redundant description.

First Embodiment

FIG. 1 is a block diagram illustrating an example of the schematic structure of an image processing apparatus 1 according to the first embodiment of the present disclosure. For example, the image processing apparatus 1 is installed in a vehicle V.

Referring to FIG. 1, the image processing apparatus 1 includes a microcomputer essentially including a central processing unit (CPU) 3 and a memory 5 comprised of, for example, at least one of a read-only memory (ROM) and a random-access memory (RAM), which serves as a storage unit. A semiconductor memory can be used as the memory 5.

The memory 5 stores one or more programs.

The CPU 3 has, for example, counters A and B, and is configured to run the one or more programs stored in, for example, the memory 5, thus implementing various functions corresponding to the one or more programs. That is, the memory 5 serves as, for example, a non-transitory storage medium storing one or more programs. In other words, the CPU 3 runs one or more programs stored in the memory 5, thus carrying out various methods corresponding to the one or more programs. Note that the non-transitory storage medium is defined as a storage medium excluding transitory media, such as electromagnetic waves.

In addition, note that an initial value of each of the counters A and B is set to zero.

Figure 2:
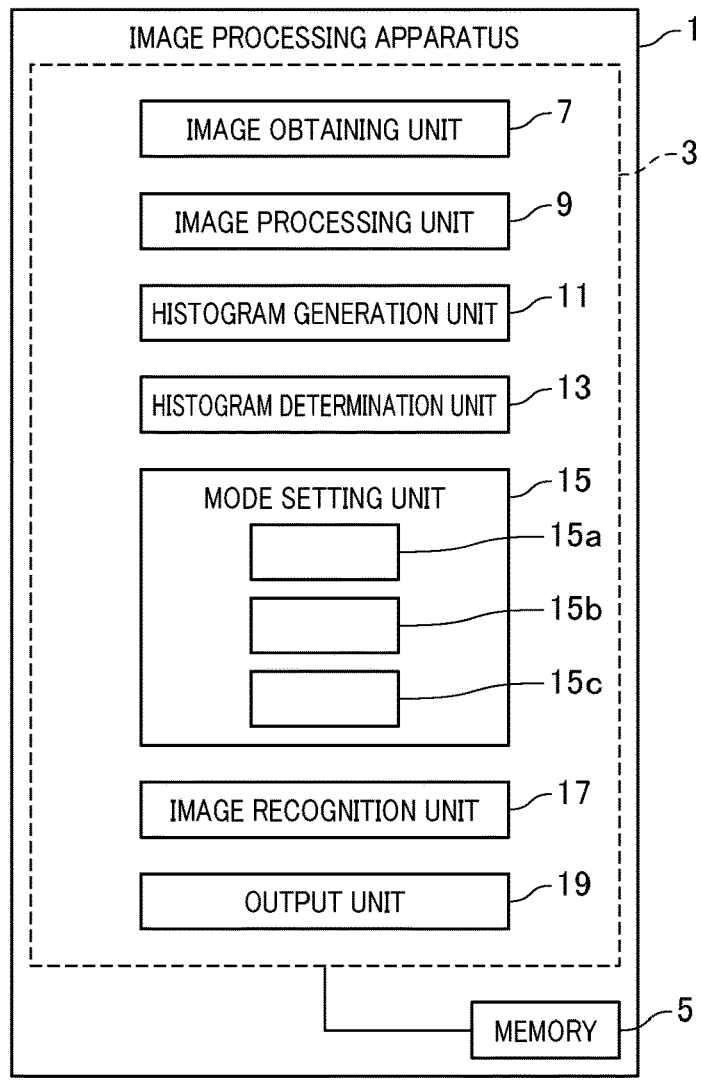
FIG. 2 is a block diagram schematically illustrating an example of the functional structure of the image processing apparatus illustrated in FIG. 1.

Referring to FIG. 2, the image processing apparatus 1, i.e. the CPU 3, functionally includes an image obtaining unit 7, an image processing unit 9, a histogram generation unit 11, a histogram determination unit 13, a mode setting unit 15, an image recognition unit 17, and an output unit 19. Note that the mode setting unit 15 includes, for example, a shift unit 15a serving as, for example, a changing unit, a maintaining unit 15b, and a return unit 15c.

The CPU 3 of the image processing unit 1 can execute an image processing program stored in the the memory 5 to thereby implement these functional blocks 7 to 19.

That is, at least part of all functions provided by the image processing apparatus 1 can be implemented by at least one processor; the at least one processor can be comprised of (1) The combination of at least one programmed processing unit, i.e. at least one programmed logic circuit, and at least one memory including software that causes the at least one programed logic circuit to implement all the functions (2) At least one hardwired logic circuit that implements all the functions (3) At least one hardwired-logic and programmed-logic hybrid circuit that implements all the functions Referring to FIG. 1, the image processing apparatus 1 is communicably connected to a vehicular camera 21 and a cruse assist apparatus 23 installed in, for example, the vehicle V.

The vehicular camera 21 is comprised of, for example, a lens system 21a and an imager 21b, such as a known charge-coupled device (CCD) imager or a complementary metal-oxide-semiconductor (CMOS) imager. The vehicular camera 21 is mounted on a predetermined portion of the vehicle.

The imager 21b of the vehicular camera 21 is comprised of a plurality of light receiving elements, which respectively correspond to a plurality of pixels, two-dimensionally arranged in both vertical and horizontal directions corresponding to the respective height direction and width direction of the vehicle V. The two-dimensionally arranged pixels constitute a light receiving surface of the image The vehicular camera 21 is configured such that the lens system 21a focuses light incident from a predetermined direction, such as the front direction, of the vehicle V on the light receiving surface of the imager 21b as an image of a predetermined region, which includes one or more target objects to be captured.

The imager 21b is configured to receive, during a controllable shutter time ST, light focused on the light receiving surface thereof as an image, so that each of the two-dimensionally arranged light-sensitive elements (pixels) receives a corresponding light component. The shutter time ST, which will also called an exposure time, during which light is received by the two-dimensionally arranged light-sensitive elements, in other words, during which the two-dimensionally arranged light-sensitive elements are exposed to light, is a control parameter controllable by, for example, the CPU 3 of the image processing apparatus 1.

Then, the imager 21b converts, using each of the light receiving elements, the intensity or luminance value for each of red, green, and blue (RGB) of a corresponding received light component into an analog pixel value or an analog pixel signal that is proportional to the luminance value of the corresponding received light component; the analog pixel values of all the pixels, i.e. light receiving elements, constitute an analog frame image.

The imager 21b is configured to convert the analog pixel signals (analog pixel values) of the analog frame image into digital pixel signals (digital pixel values) based on a predetermined bit width, i.e. the number of bits corresponding predetermined levels of gray, thus obtaining a digital frame image comprised of two-dimensionally arranged pixels, each of which has a corresponding digital pixel value. Then, the imager 21b sends, to the image processing apparatus 1, the digital frame image.

That is, the digital pixel value of each pixel of a digital frame image captured by the imager 21b is comprised of the predetermined number of bits that represents a corresponding luminance level and a corresponding chromaticity value based on corresponding RGB levels.

Note that each of the pixels of a digital frame image captured by the vehicular camera 21 has an allowable pixel-value range from a minimum pixel value to a maximum pixel value.

As another example, the imager 21b can be configured to send, to the image processing apparatus 1, the analog frame image. In this example, the image processing apparatus 1 can be configured to convert the analog pixel signals (analog pixel values) of the analog frame image into digital pixel signals (digital pixel values) based on the predetermined bit width, i.e. the number of bits, thus obtaining a digital frame image comprised of two-dimensionally arranged pixels, each of which has a corresponding digital pixel value that is proportional to the intensity or luminance value of the corresponding pixel.

Note that a dynamic range of an image captured by the vehicular camera 21 represents a range of contrast of the image. The dynamic range of an image captured by the vehicular camera 21 during a value of the shutter time ST is determined depending on the sensitivity of the light-sensitive elements of the imager 21b. In addition, the dynamic range of an image captured by the imager 21b is determined depending on the length of the shutter time ST.

That is, the CPU 3 is capable of controlling the length of the shutter time ST of the imager 21b, thus controlling the dynamic range of an image captured by the imager 21b of the vehicular camera 21.

For example, the image obtained by the vehicular camera 21 includes at least a part of a road surface on which the vehicle V is travelling.

As described later, the image processing apparatus 1 is configured to determine, based on the digital frame image, whether at least one target object is included in the digital frame image each time of receiving the digital frame image or analog frame image sent from the vehicular camera 21, and perform a recognition routine of recognizing the at least one target object included in the digital frame image. Then, the image processing apparatus 1 is configured to send, to the cruise assist apparatus 23, a result of the recognition process.

For example, the image processing apparatus 1 performs the recognition routine of recognizing, as the at least one target object included in the digital frame image, lane markers of the road surface on which the vehicle V is travelling, other vehicles, pedestrians, and/or stationary objects.

The cruise assist apparatus 23 receives the result of the recognition routine sent from the image processing apparatus 1. The cruise assist apparatus 23 is configured to perform, based on the result of the recognition, a cruise assist task including, for example, at least one of 1. Automatic braking of the vehicle V
2. Automatic steering of the vehicle V
3. Lane keeping of the vehicle V, which keeps the vehicle V within a target lane
4. Outputting of warning Next, the following describes the recognition routine carried out by the image processing apparatus 1, i.e. the CPU 3 thereof, with reference to FIGS. 3 to 6. For example, the image processing apparatus 1 is programmed to start the recognition routine each time the digital frame image is sent thereto from the vehicular camera 21. For example, the vehicular camera 21 is configured to send a captured digital frame image to the image processing apparatus 1 every predetermined period, so that the CPU 3 performs the recognition routine every predetermined period. One recognition routine periodically performed by the image processing apparatus 1 will be referred to as a cycle.

Figure 3:
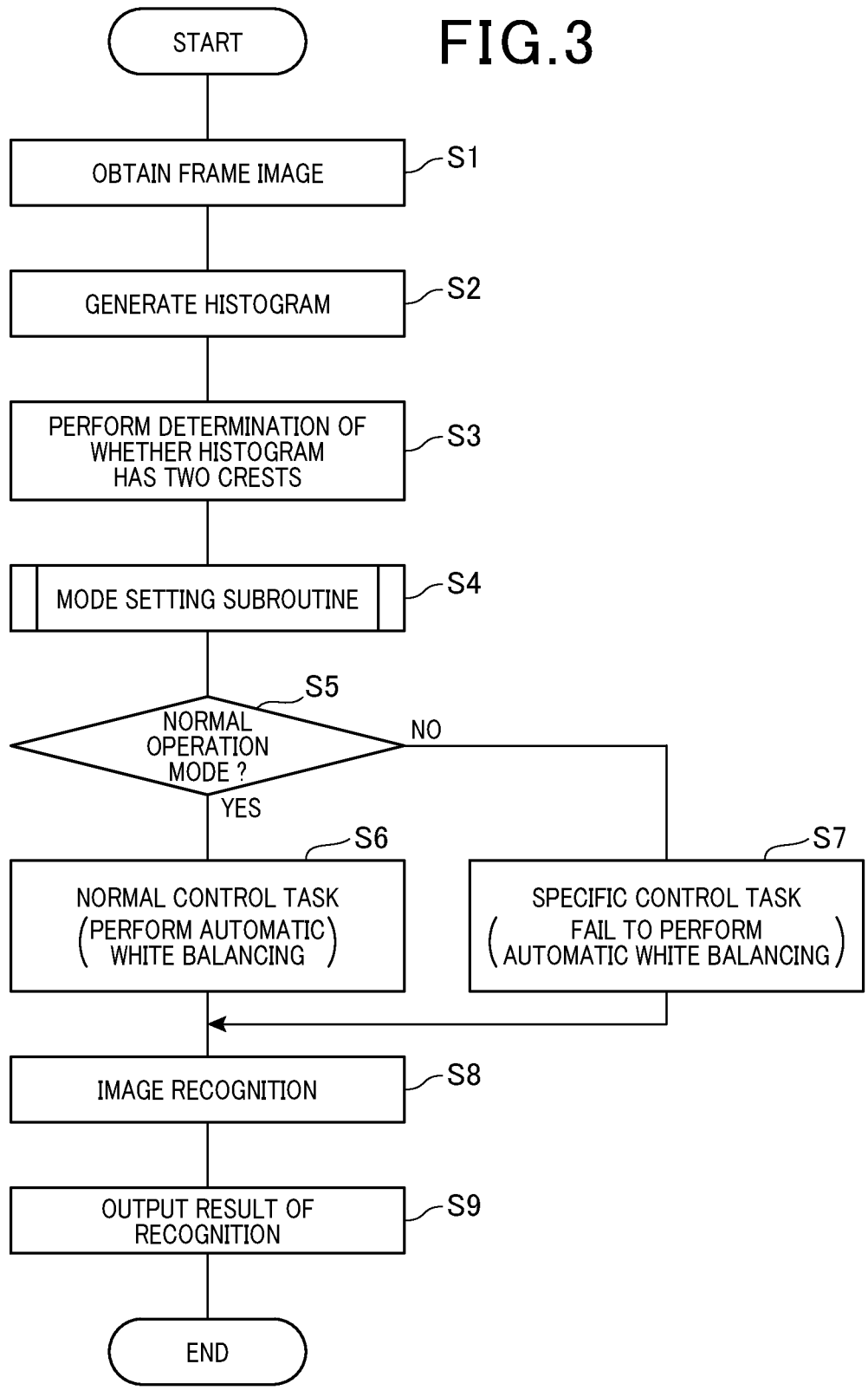
FIG. 3 is a flowchart schematically illustrating an example of a recognition routine carried out by the image processing apparatus illustrated in FIG. 1.

When starting a current cycle of the recognition routine, the CPU 3 serves as, for example, the image obtaining unit 7 to obtain the digital frame image sent from the vehicular camera 21 in step S1 of FIG. 3; the digital frame image is comprised of the two-dimensional arranged pixels, each of which has a corresponding digital pixel value that is proportional to the intensity or luminance value of the corresponding pixel.

Because the digital frame image includes the road surface, the CPU 3 serves as, for example, the histogram generation unit 11 to extract, from the digital frame image, a road-surface region representing the road surface on which the vehicle V is travelling in step S2. For example, the CPU 3 serves as the histogram generation unit 11 to identify, from the digital frame image, the road-surface region whose pixel values are distinguished from the other pixel values of the other regions in the digital frame image in step S2. Note that the road-surface region is usually located in the lower side of the digital frame image.

Then, the CPU 3 serves as, for example, the histogram generation unit 11 to generate a histogram of pixel values, i.e. a histogram of luminance values of pixels, included in the identified road-surface region in, for example, the memory 5 in step S2. Note that the histogram represents a graphical representation of a frequency distribution in which a horizontal axis of the graph lists each pixel value included in the identified road-surface region, and a vertical axis of the graph represents the frequency of the corresponding pixel value. That is, the histogram is defined as a graphical representation indicative of the relationship between each pixel value included in the identified road-surface region and a frequency of the corresponding pixel value.

In particular, the graphical histogram generated in step S2 is configured such that the respective frequencies of the pixel values are plotted by a curve (see FIGS. 5 and 6 described later).

Next, the CPU 3 serves as, for example, the histogram determination unit 13 to determine whether the histogram generated in step S2 has two separate local crests, i.e. first and second separate local crests, in step S3.

Figure 5:
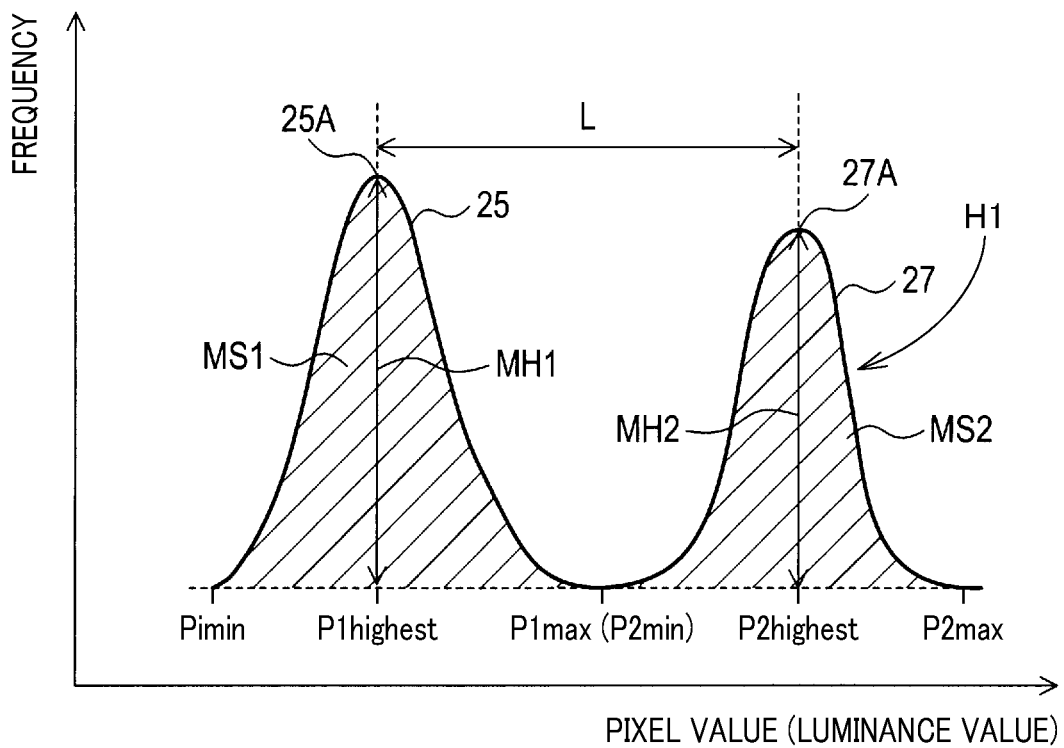
FIG. 5 is a graph schematically illustrating an example of a histogram having two separate local crests.

FIG. 5 schematically illustrates a typical example histogram H1 generated in step S2, which has first and second separate local crests 25 and 27.

The first local crest 25 has a convex upward shape within a predetermined first pixel-value width from a first minimum pixel value P1min to a first maximum pixel value P1max, and has a positive peak (see reference numeral 25A) corresponding to a first local highest frequency pixel value $P1_{highst}$.

Similarly, the second local positive peak 27 has a convex upward shape within a predetermined second pixel-value width from a second minimum pixel value P2min to a second maximum pixel value P2max, and has a positive peak (see reference numeral 27A) corresponding to a second local highest frequency pixel value $P2_{highst}$. Note that, in FIG. 5, the first maximum pixel value P1max is identical to the second minimum pixel value P2min.

Figure 6:
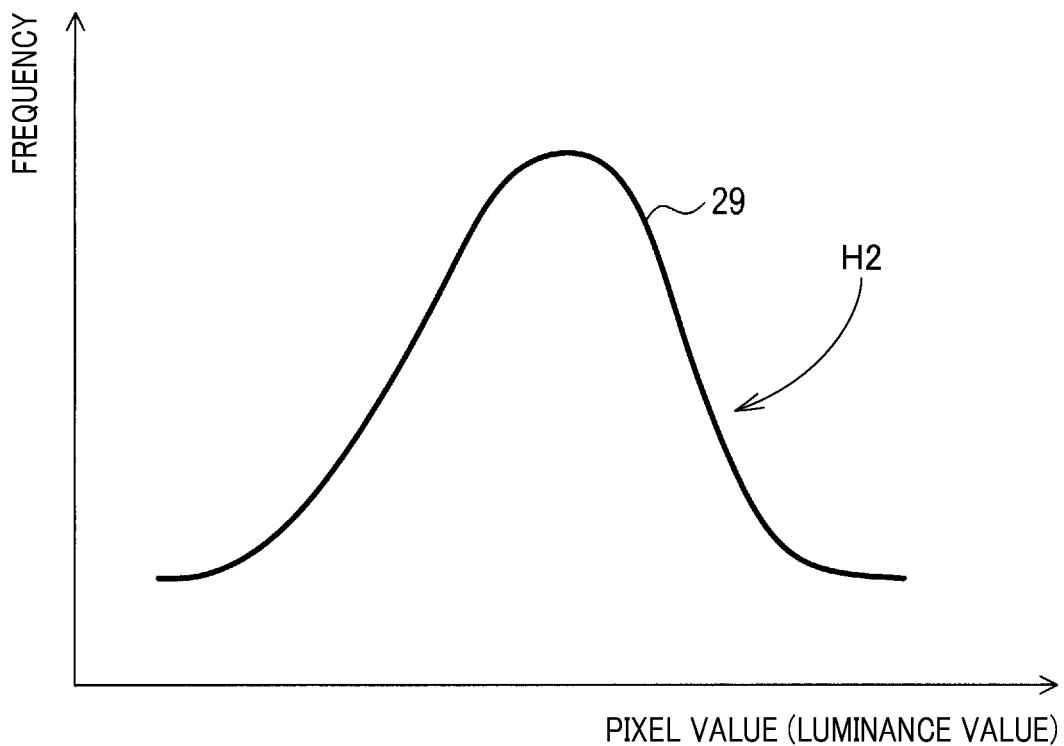
FIG. 6 is a graph schematically illustrating an example of a histogram having a single local crest.

In contrast, FIG. 6 schematically illustrates a typical example histogram H2 generated in step S2, which has a single crest 29.

The inventor of the present disclosure has found that histograms, each of which represents a frequency distribution of pixel values included in a road-surface region in an image captured in, for example, a specific situation where the road surface is wet due to rain or another factor during evening hours from dusk to dawn, show a pronounced tendency to have two separate local crests. This is because the road-surface region included in a captured frame image in the specific situation is substantially divided into a first surface region and a second surface region. The first surface region has specular reflection of ambient light, and therefore has higher pixel values that are close to each other. The second surface region, which is the remaining region in the road-surface region except the first surface region, reflects less ambient light, and therefore has lower pixel values that are close to each other.

That is, the first local crest 25 and the second local crest 27 are different in location from each other, so that the first local highest frequency pixel value $P1_{highst}$ is separated from the second local highest frequency pixel value $P2_{highst}$.

Specifically, the CPU 3 serves as the histogram determination unit 13 to determine that the histogram generated in step S2 has first and second separate local crests upon determining that the following first condition is satisfied:

The first condition is that the minimum difference L between the positive peak 25A of the first local crest 25 and the positive peak 27A of the second local crest 27 in the horizontal direction in the histogram H1 becomes equal to or more than a predetermined threshold length. This reduces an erroneous determination that the histogram generated in step S2 has first and second separate local crests although the histogram generated in step S2 actually has a single crest.

Alternatively, the CPU 3 can serve as the histogram determination unit 13 to determine that the histogram generated in step S2 has first and second separate local crests in step S3 upon determining that the following one of second and third conditions is satisfied:

The second condition is that the ratio of an area MSmin to an area MSmax is equal to or more than a predetermined value X, which is expressed by the following equation (1):

$$MSmin/MSmax \geq X \quad (1)$$

where:
1. MSmin represents the smaller one of a first area MS1 of the first local crest 25 and a second area MS2 of the second local crest 27
2. MSmax represents the larger one of the first area MS1 of the first local crest 25 and the second area MS2 of the second local crest 27
3. The first area MS1 of the first local crest 25 represents an area of the first local crest 25 over the first pixel-value width from the first minimum pixel value P1min to the first maximum pixel value P1max
4. The second area MS2 of the second local crest 27 represents an area of the second local crest 27 over the second pixel-value width from the second minimum pixel value P2min to the second maximum pixel value P2max
5. The value X is set to be larger than zero and equal to or smaller than 1

The third condition is that the ratio of a height MHmin to a height MHmax is equal to or more than a predetermined value Y, which is expressed by the following equation (2):

$$MHmin/MHmax \geq Y \quad (2)$$

where:
1. MHmin represents the smaller one of the maximum height MH1 of the first local crest 25 at its positive peak 25A and the maximum height MH2 of the second local crest 27 at its positive peak 27A
2. MHmax represents the larger one of the maximum height MH1 of the first local crest 25 at its positive peak 25A and the maximum height MH2 of the second local crest 27 at its positive peak 27A
3. The value Y is set to be larger than zero and equal to or smaller than 1

That is, the CPU 3 serves as the histogram determination unit 13 to obtain
1. A first determination result that the histogram generated in step S2 has first and second separate local crests in step S3
2. A second determination result that the histogram generated in step S2 does not have first and second separate local crests in step S3

Following the operation in step S3, the CPU 3 serves as, for example, the mode setting unit 15 to perform a mode setting subroutine.

Figure 4:
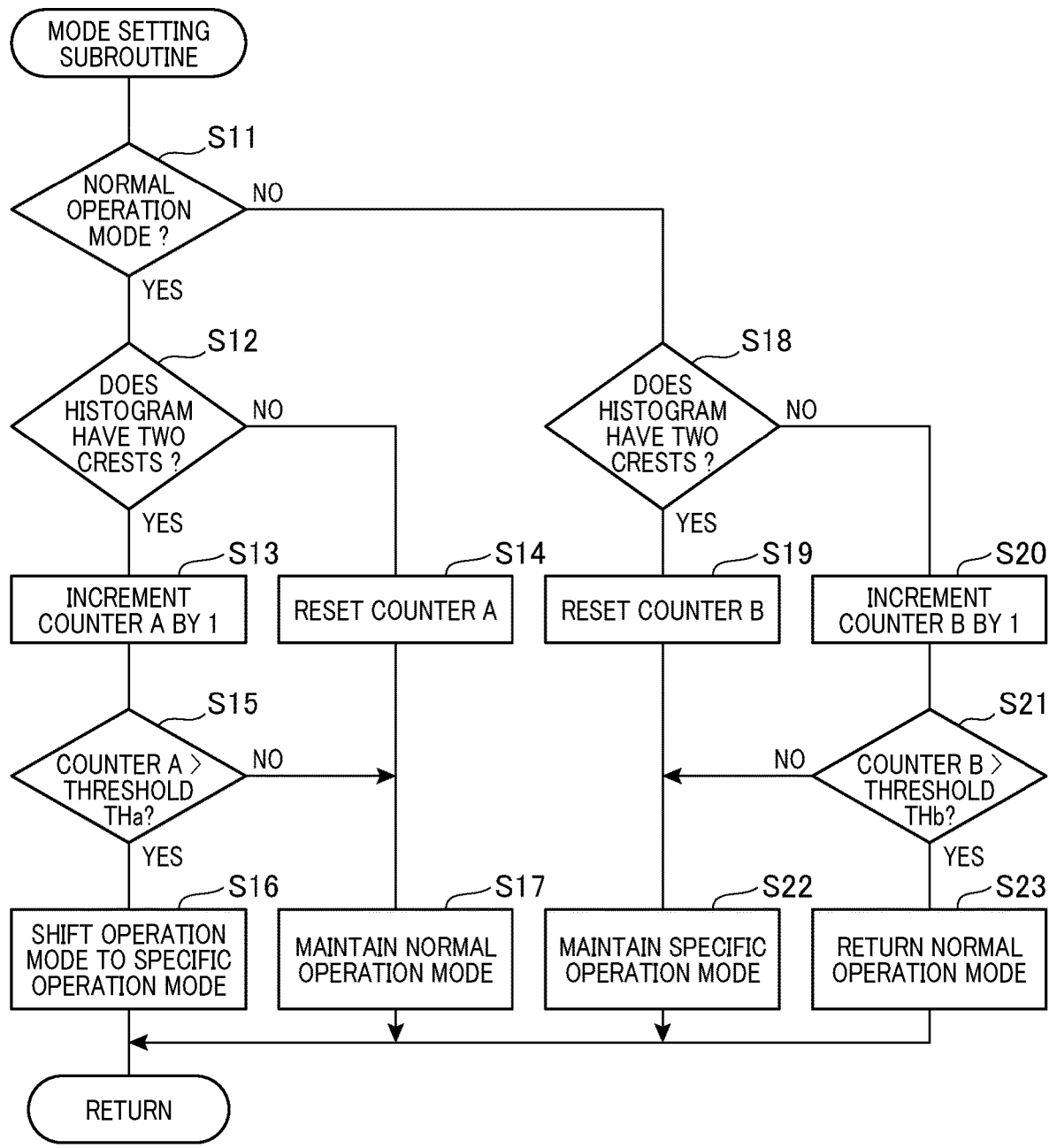
FIG. 4 is a flowchart schematically illustrating an example of a mode setting subroutine illustrated in FIG. 3.

The following describes the operation mode setting subroutine carried out by the CPU 3 serving as the mode setting unit 15 with reference to FIG. 4.

When starting the operation mode setting subroutine, the CPU 3 serves as, for example, the mode setting unit 15 to determine whether the image processing apparatus 1 is in a normal operation mode or a specific operation mode in accordance with an operation mode flag in step S11. Note that the operation mode flag is, for example, a bit having a logical high level, represented by 1, or a logical low level, represented by 0. The operation mode flag having the logical high level 1 represents that an operation mode of the image processing apparatus 1 is the specific operation mode, and the operation mode flag having the logical low level 0 represents that the operation mode of the image processing apparatus 1 is the normal operation mode. The initial value of the operation mode flag is set to the logical low level of 0.

Upon determination that the image processing apparatus 1 is in the normal operation mode (YES in step S11), the recognition routine proceeds to step S12. Otherwise, upon determination that the image processing apparatus 1 is in the specific operation mode (NO in step S11), the recognition routine proceeds to step S18.

In step S12, the CPU 3 serves as, for example, the mode setting unit 15 to determine whether the immediately previous operation in step S3 has obtained the first determination result that the histogram generated in step S2 has first and second separate local crests or the second determination result that the histogram generated in step S2 does not have first and second separate local crests.

Upon determination that the immediately previous operation in step S3 has obtained the first determination result that the histogram generated in step S2 has first and second separate local crests (YES in step S12), the recognition routine proceeds to step S13. Otherwise, upon determination that the immediately previous operation in step S3 has obtained the second determination result that the histogram generated in step S2 does not have first and second separate local crests (NO in step S12), the recognition routine proceeds to step S14.

In step S13, the CPU 3 serves as, for example, the mode setting unit 15 to increment a present value of the counter A by 1. For example, when executing the operation in step S13 for the first time after activation of the image processing apparatus 1 or after resetting of the counter A, the mode setting unit 15 increments the initial value of zero of the counter A by 1. The mode setting subroutine after the operation in step S13 proceeds to step S15.

In step S14, the CPU 3 serves as, for example, the mode setting unit 15 to reset the counter A to the initial value of zero. The mode setting subroutine after the operation in step S15 proceeds to step S17.

In step S15, the CPU 3 serves as, for example, the mode setting unit 15 to determine whether the present value of the counter A is more than a predetermined threshold THa. The predetermined threshold THa is set to an integer equal to or more than 1, preferably to 2 or more. Upon determination that the present value of the counter A is more than the predetermined threshold THa (YES in step S15), the mode setting subroutine proceeds to step S16. Otherwise, upon determination that the present value of the counter A is equal to or less than the predetermined threshold THa (NO in step S15), the mode setting subroutine proceeds to step S17.

In step S16, the CPU 3 serves as, for example, the shift unit 15a of the mode setting unit 15 to shift or switch the operation mode of the image processing apparatus 1 from the normal operation mode to the specific operation mode.

Otherwise, in step S17, the CPU 3 serves as, for example, the maintaining unit 15b of the mode setting unit 15 to maintain or hold the operation mode of the image processing apparatus 1 in the normal operation mode.

Following the negative determination in step S11, the CPU 3 serves as, for example, the mode setting unit 15 to determine whether the immediately previous operation in step S3 has obtained the first determination result that the histogram generated in step S2 has first and second separate local crests or the second determination result that the histogram generated in step S2 does not have first and second separate local crests in step S18.

Upon determination that the immediately previous operation in step S3 has obtained the first determination result that the histogram generated in step S2 has first and second separate local crests (YES in step S18), the recognition routine proceeds to step S19. Otherwise, upon determination that the immediately previous operation in step S3 has obtained the second determination result that the histogram generated in step S2 does not have first and second separate local crests (NO in step S18), the recognition routine proceeds to step S20.

In step S19, the CPU 3 serves as, for example, the mode setting unit 15 to reset the counter B to the initial value of zero. The mode setting subroutine after the operation in step S19 proceeds to step S22.

In step S20, the CPU 3 serves as, for example, the mode setting unit 15 to increment a present value of the counter B by 1. For example, when executing the operation in step S20 for the first time after activation of the image processing apparatus 1 or after resetting of the counter B, the mode setting unit 15 increments the initial value of zero of the counter B by 1. The mode setting subroutine after the operation in step S120 proceeds to step S21.

In step S21, the CPU 3 serves as, for example, the mode setting unit 15 to determine whether the present value of the counter B is more than a predetermined threshold THb. The predetermined threshold THb is set to an integer equal to or more than 1, preferably to 2 or more.

Upon determination that the present value of the counter B is equal to or less than the predetermined threshold THb (NO in step S21), the mode setting subroutine proceeds to step S22.

Otherwise, upon determination that the present value of the counter B is more than the predetermined threshold THb (YES in step S21), the mode setting subroutine proceeds to step S23.

In step S22, the CPU 3 serves as, for example, the maintaining unit 15b of the mode setting unit 15 to maintain or hold the operation mode of the image processing apparatus 1 in the specific operation mode.

That is, because the recognition routine, that is, the mode setting subroutine, is carried out each time the digital frame image is sent from the vehicular camera 21 to the image processing apparatus 1, the affirmative determination in step S21 represents that the determination in step S3 for each of a predetermined number of continuous digital frame images, which is identical to the sum of the predetermined threshold THb and 1, has obtained the first determination result.

Otherwise, in step S23, the CPU 3 serves as, for example, the return unit 15c of the mode setting unit 15 to return the operation mode of the image processing apparatus 1 from the specific operation mode to the normal operation mode.

After completion of the operation in step S16, S17, S22, or S23, the CPU 3 returns to the main recognition routine illustrated in FIG. 3, and serves as, for example, the operation mode determination unit 15 to determine, in step S5, that the image processing apparatus 1 is in the normal operation mode or the specific operation mode in the present cycle of the recognition routine in accordance with the result of the operation in step S4.

Upon determination that the image processing apparatus 1 is in the normal operation mode (YES in step S5), the CPU 3 serves as, for example, the image processing unit 9 to perform a predetermined normal control task, i.e. normal image-processing task, of the digital frame image in the normal operation mode; the normal control task includes automatic white balancing in step S6. The following describes how the image processing unit 9 performs the automatic white balancing of the digital frame image in step S6.

First, the image processing unit 9 selectably identifies the road-surface region in the digital frame image in the same approach as that in step S2.

Next, the image processing unit 9 performs a first exclusion task of

1. Excluding, from all the pixels of the road-surface region, one or more pixels each having an excessively high pixel value that is higher than a predetermined allowable upper limit 2. Excluding, from all the pixels of the road-surface region, one or more pixels each having an excessively low pixel value that is lower than a predetermined allowable lower limit.

Subsequently, the image processing unit 9 performs a second exclusion task of further excluding, from the remaining pixels in the road-surface region after execution of the first exclusion task, one or more pixels whose corresponding colors are located outside a predetermined UV color space.

Following execution of the second exclusion task, the image processing unit 9 obtains an average color, i.e. an average color temperature, of the remaining pixels in the road-surface region after execution of the second exclusion task, and sets the average color temperature as a color temperature of the ambient light. Then, the image processing unit 9 performs known automatic white balancing of the digital frame image obtained in step S1 in accordance with the obtained color temperature of the ambient light to thereby adjust the digital frame image, thus preserving the true white color in at least one white object included in the digital frame image.

Otherwise, upon determination that the image processing apparatus 1 is in the specific operation mode (NO in step S5), the CPU 3 serves as, for example, the image processing unit 9 to perform a predetermined specific control task, i.e. specific image-processing task, of the digital frame image in the specific operation mode; the specific control task does not include the automatic white balancing, and is suitable for the specific situation set forth above in step S7. In step S7, the image processing unit 9 can be configured not to perform any control task.

Following the operation in step S7, the CPU 3 serves as, for example, the image recognition unit 17 to perform a known image recognition task of recognizing the at least one target object in the digital frame image, which has been subjected to the normal control task or the specific control task has been subjected in step S6 or S7, in step S8. What the at least one target object is has been described above.

Next, the CPU 3 serves as, for example, the output unit 19 to output the result of the image recognition task carried out in step S8 to the cruise assist apparatus 23 in step S9, and thereafter, terminates the current cycle of the recognition routine. Note that what the cruise assist apparatus 23 performs as the cruise assist task has been described above.

The following describes how the image processing apparatus 1 works and achieves technical benefits.

The image processing apparatus 1 is configured to

1. Determine whether the histogram of pixel values included in a predetermined region in a captured frame image has first and second separate local crests 2. Shift the operation mode of the image processing apparatus 1 from the normal operation mode to the specific operation mode upon determination that the histogram has first and second separate local crests 3. Hold the operation mode in the normal operation mode upon determination that the histogram does not have first and second separate local crests 4. Perform the normal control task in the normal operation mode, or the specific control task in the specific operation mode; the specific control task is different from the normal control task That is, the image processing apparatus 1 is configured to change the image-processing task from one of the normal control task and the specific control task to the other thereof in accordance with whether the histogram has first and second separate local crests.

If the histogram has first and second separate crests as illustrated in FIG. 5, the corresponding frame image is likely to be captured in the specific situation where the road surface is wet due to rain or another factor during night-time from dusk to dawn.

Execution of the normal control task in the specific situation likely causes the histogram based on the captured frame image to have first and second separate local crests; the corresponding pixel values of the second local crest are higher than the corresponding pixel values of the first local crest. This is because the road-surface region included in the captured frame image in the specific situation is substantially divided into the first surface region and the second surface region. The first surface region has specular reflection of ambient light, and therefore has higher pixel values that are close to each other, resulting in the second local crest 27 (see FIG. 5). The second surface region, which is the remaining region in the road-surface region except the first surface region, cannot reflect the ambient light, and therefore has lower pixel values that are close to each other, resulting in the first local crest 25 (see FIG. 5).

Because the second surface region is likely to be larger than the first surface region, it may be difficult to execute the normal control task in the specific situation due to deficiency of ambient light reflected from the second surface region.

In contrast, because the specific control task is suitable for the specific situation set forth above, the image processing apparatus 1 achieves a first technical benefit of appropriately performing the specific control task even if the histogram has first and second separate local crests.

If the frame image is captured in the specific situation where the road surface is wet due to rain or another factor during night-time, illumination light from, for example, the headlights of the vehicle V, is mainly specularly reflected by the wet road surface instead of being diffusely reflected thereby. This results in the most part of the road surface failing to reflect ambient light. For this reason, it is difficult to obtain a sufficient amount of ambient light required to perform the automatic white balancing in the specific situation. That is, it is difficult to appropriately perform the automatic white balancing of the captured frame image in the specific situation due to inaccurate estimation of the ambient light.

From this viewpoint, the image processing apparatus 1 of the first embodiment is configured to change the operation mode of the image processing apparatus 1 from the normal operation mode to the specific operation mode upon determination that the histogram has first and second separate local crests, thus stopping execution of the automatic white balancing. That is, because the histogram has first and second separate local crests, the frame image is likely to be captured while the road surface is wet during night-time.

This configuration of the image processing apparatus 1 therefore achieves a second technical benefit of preventing execution of the automatic white balancing of the captured frame image unsuitable for the specific situation where the road surface is wet during night-time.

The image processing apparatus 1 is also configured to return the operation mode thereof from the specific operation mode to the normal operation mode upon determination that the histogram based on each of the predetermined number of continuous frame images after change of the normal operation mode to the specific operation mode does not have first and second separate local crests.

This configuration therefore achieves a third technical benefit that enables the image processing apparatus 1 to execute the normal control task suitable for the frame image newly captured by the vehicular camera 21, which does not have first and second separate local crests.

Specifically, the image processing apparatus 1 is configured to return the operation mode thereof from the specific operation mode to the normal operation mode as long as it is determined that the histogram based on each of the predetermined number of continuous frame images has first and second separate local crests. This configuration therefore achieves the third technical benefit that prevents the image processing apparatus 1 from erroneously returning the operation mode thereof from the specific operation mode to the normal operation mode due to, for example, a single frame image having large noise.

Second Embodiment

Figure 7A:
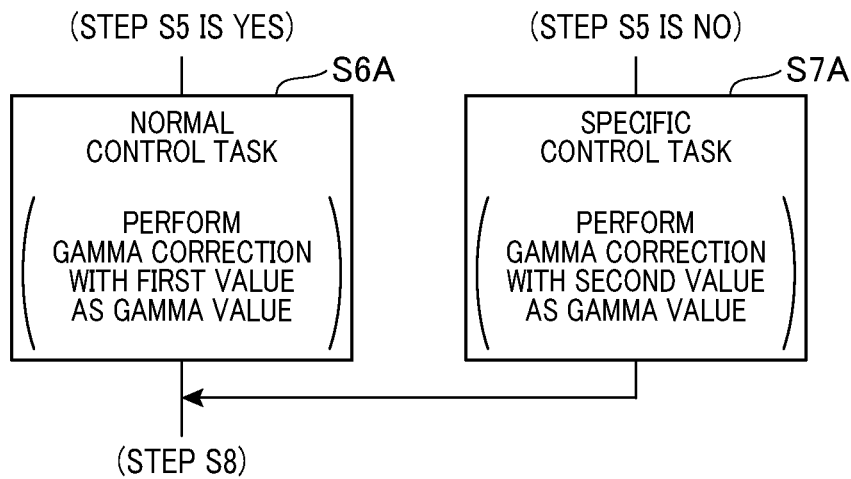
FIG. 7A is a flowchart schematically illustrating a part of a recognition routine according to the second embodiment of the present disclosure.
Figure 8:
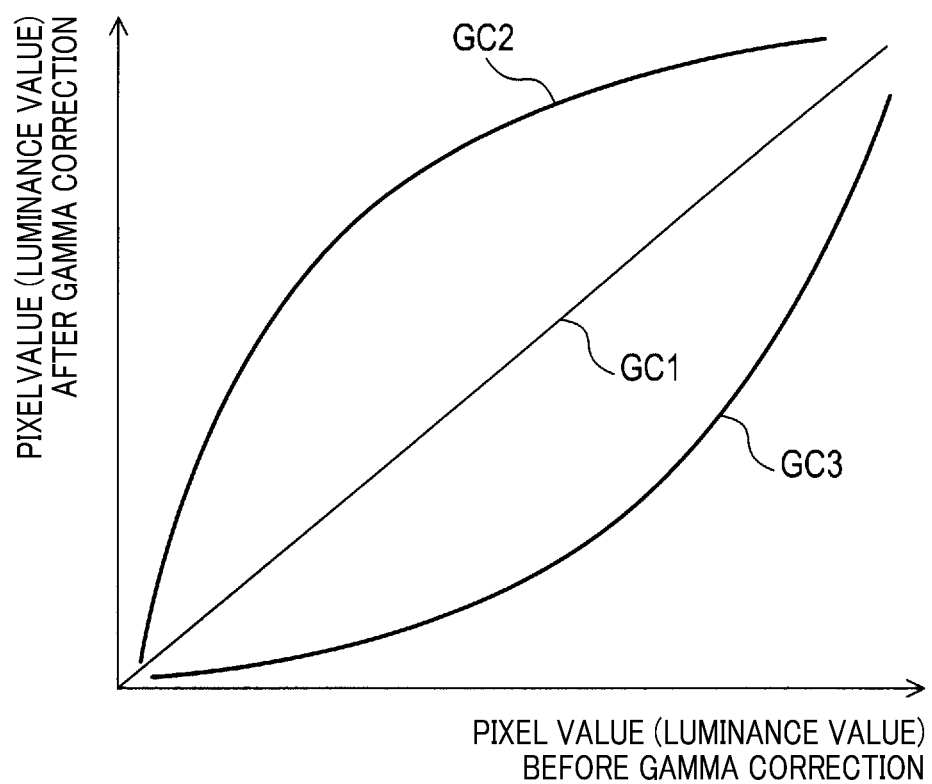
FIG. 8 is a graph schematically illustrating an example of a gamma curve.

The following describes an image processing apparatus according to the second embodiment of the present disclosure with reference to FIGS. 7A and 8. The configuration and functions of the image processing apparatus according to the second embodiment are mainly different from those of the image processing apparatus 1 according to the first embodiment by the following points. The following therefore mainly describes the different points.

The difference between the normal control task and the specific control task according to the first embodiment is whether to carry out the automatic white balancing.

In contrast, the CPU 3 of the image processing apparatus of the second embodiment serves as, for example, the image processing unit 9 to execute the normal control task including gamma correction having a first correlation, i.e. a first ratio, of each of gamma-corrected pixel values to a corresponding original pixel value in the normal operation mode in the normal operation mode in step S6A of FIG. 7A.

The CPU 3 of the image processing apparatus of the second embodiment also serves as, for example, the image processing unit 9 to execute the specific control task that includes the gamma correction having a second correlation, i.e. a second ratio, of each of gamma-corrected pixel values to a corresponding original pixel value in the specific operation mode in step S7A of FIG. 7A; the first correlation is different from the second correlation.

The normal control task of the second embodiment is configured to apply the gamma correction to each pixel value of an input frame image obtained as the digital frame image in step S1, to which the gamma correction has not been applied, to thereby generate a corresponding gamma-corrected pixel value of an output frame image such that the correlation between each of the gamma-corrected pixel values and the corresponding original pixel value is mapped in a predetermined gamma curve GC1, which is a substantially linear curve, as illustrated in FIG. 7.

Note that the normal control task can be configured not to perform the gamma correction of the input frame image.

For example, the ratio, i.e. the gamma value, between the gamma-corrected pixel value of each pixel in the corrected output frame image and the original pixel value of the corresponding pixel in the input frame image in the gamma curve GC1 is set to 1.

In contrast, the specific control task of the second embodiment is configured to apply the gamma correction to each pixel value of an input frame image obtained as the digital frame image in step S1, to which the gamma correction has not been applied, to thereby generate a corresponding gamma-corrected pixel value of an output frame image such that the correlation between each of the gamma-corrected pixel values and the corresponding original pixel value is mapped in a predetermined gamma curve GC2, which is a substantially a convex upward curve, as illustrated in FIG. 7. That is, the correlation between the gamma-corrected pixel value of each pixel in the corrected output frame image and the original pixel value of the corresponding pixel in the input frame image in the gamma curve GC2 is set to be higher than 1.

This therefore results in the pixel value of each pixel of the digital frame image, which has been subjected to the specific control task, being higher than the pixel value of the corresponding pixel of the digital frame image, which has been subjected to the normal control task.

Assuming that the total region of the pixels in the digital frame image are divided in half into a lower pixel-value region and a higher pixel-value region, the specific control task results in many levels of gray to be allocated to the lower pixel-value region as compared with the higher pixel-value region, although the normal control task results in the levels of gray are equally allocated to the lower pixel-value region and the higher pixel-value region.

The image processing apparatus of the second embodiment described above achieves the following fourth technical benefit in addition to the above first and third technical benefits achieved by the image processing apparatus 1 of the first embodiment.

If the frame image is captured in the specific situation where the road surface is wet due to rain or another factor during night-time, the percentage of a dark region in the frame image becomes higher. It is usually difficult to recognize the at least one target object in the dark region in the frame image.

From this viewpoint, the image processing apparatus of the second embodiment is configured to change the operation mode of the image processing apparatus 1 from the normal operation mode to the specific operation mode upon determination that the histogram has first and second separate local crests, thus performing the gamma correction of the specific control task, which is different from the gamma correction of the normal control task. That is, because the histogram has first and second separate local crests, the frame image is likely to be captured while the road surface is wet during night-time.

This configuration of the image processing apparatus of the second embodiment shifts the operation mode of the image processing apparatus 1 from the normal operation mode to the specific operation mode while the road surface is wet during night-time. This enables many levels of gray to be allocated to the lower pixel-value region as compared with the higher pixel-value region, although the normal control task results in the levels of gray are equally allocated to the lower pixel-value region and the higher pixel-value region.

This therefore achieves the fourth technical benefit that makes it possible to reliably recognize the at least one target object located in even a dark region of the digital frame image.

Third Embodiment

Figure 7B:
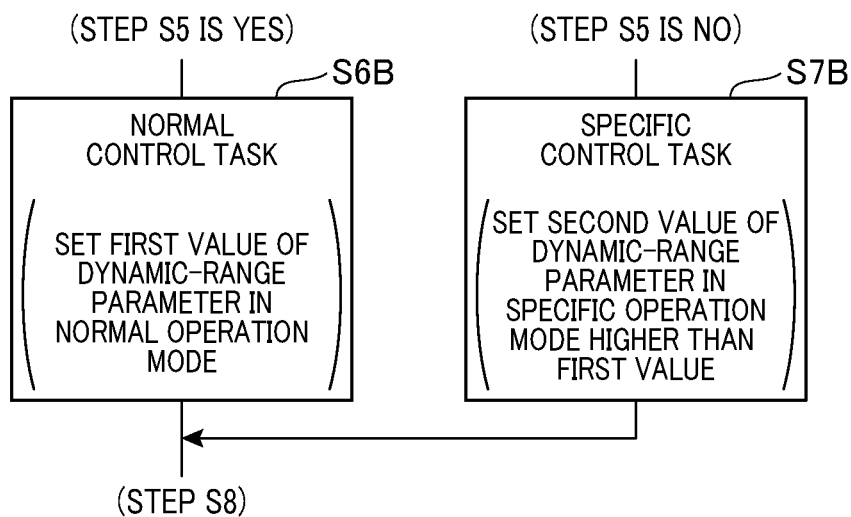
FIG. 7B is a flowchart schematically illustrating a part of a recognition routine according to the third embodiment of the present disclosure.

The following describes an image processing apparatus according to the third embodiment of the present disclosure with reference to FIG. 7B. The configuration and functions of the image processing apparatus according to the third embodiment are mainly different from those of the image processing apparatus 1 according to the first embodiment by the following points. The following therefore mainly describes the different points.

The difference between the normal control task and the specific control task according to the first embodiment is whether to carry out the automatic white balancing.

In contrast, the CPU 3 of the image processing apparatus of the third embodiment serves as, for example, the image processing unit 9 to perform the normal control task that sets a first value of the shutter time ST of the vehicular camera 21 for capturing a next frame image by the vehicular camera 21 in the normal operation mode in step S6B of the current cycle of the recognition routine in FIG. 7B; the shutter time ST serves as a dynamic-range parameter for determining the dynamic range of the next frame image.

The CPU 3 of the image processing apparatus of the third embodiment also serves as, for example, the image processing unit 9 to perform the specific control task that sets a second value of the shutter time ST of the vehicular camera 21 to be larger than the first value of the shutter time ST set by the normal control task in step S7B of the current cycle of the recognition routine in FIG. 7B.

That is, the dynamic range of the next frame image captured by the vehicular camera 21 while the image processing apparatus is in the specific control mode becomes larger than the dynamic range of the next frame image captured by the vehicular camera 21 while the image processing apparatus is in the normal control mode The image processing apparatus of the third embodiment described above achieves the following fifth technical benefit in addition to the above first and third technical benefits achieved by the image processing apparatus 1 of the first embodiment.

If the frame image is captured in the specific situation where the road surface is wet due to rain or another factor during night-time, the percentage of a dark region in the frame image becomes higher. It is usually difficult to recognize the at least one target object in the dark region in the frame image.

From this viewpoint, the image processing apparatus of the third embodiment is configured to change the operation mode of the image processing apparatus 1 from the normal operation mode to the specific operation mode upon determination that the histogram has first and second separate local crests, thus enlarging the dynamic range of a next frame image to be captured by the vehicular camera 21.

This configuration of the image processing apparatus of the third embodiment enlarges the dynamic range of a next frame image to be captured by the vehicular camera 21 while the road surface is wet during night-time. This therefore achieves the fifth technical benefit that makes it possible to reliably recognize the at least one target object located in even a dark region of the obtained frame image.

Fourth Embodiment

Figure 7C:
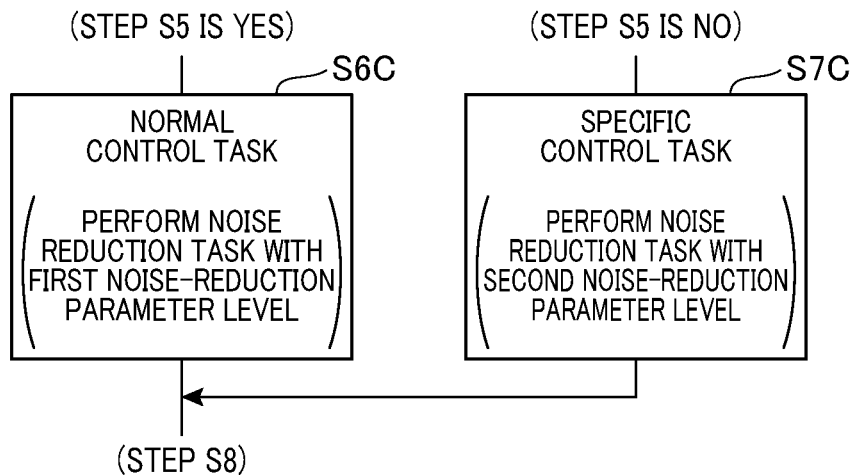
FIG. 7C is a flowchart schematically illustrating a part of a recognition routine according to the fourth embodiment of the present disclosure.

The following describes an image processing apparatus according to the fourth embodiment of the present disclosure with reference to FIG. 7C. The configuration and functions of the image processing apparatus according to the fourth embodiment are mainly different from those of the image processing apparatus 1 according to the first embodiment by the following points. The following therefore mainly describes the different points.

The difference between the normal control task and the specific control task according to the first embodiment is whether to carry out the automatic white balancing.

In contrast, the CPU 3 of the image processing apparatus of the fourth embodiment serves as, for example, the image processing unit 9 to perform the normal control task including a noise reduction task having a predetermined first noise-reduction performance level for removing a predetermined first amount of noise from the digital frame image in the normal operation mode in step S6C of FIG. 7C.

The CPU 3 of the image processing apparatus of the fourth embodiment also serves as, for example, the image processing unit 9 to perform the specific control task including the noise reduction task having a predetermined second noise-reduction performance level for removing a predetermined second amount of noise from the digital frame image in the specific operation mode in step S7C of FIG. 7C. The second noise-reduction performance level is set to be higher than the first noise-reduction performance level, so that the second amount of noise is larger than the first amount of noise.

That is, the CPU 3 of the fourth embodiment is configured to apply, in the normal operation mode, the noise reduction task to an input frame image obtained as the digital frame image in step S1 based on the first noise-reduction performance level to thereby generate an output frame image from which the first amount of noise has been removed.

In contrast, the CPU 3 of the fourth embodiment is configured to apply, in the specific operation mode, the noise reduction task to an input frame image obtained as the digital frame image in step S1 based on the second noise-reduction performance level to thereby generate an output frame image from which the second amount of noise has been removed.

The image processing apparatus of the fourth embodiment described above achieves the following sixth technical benefit in addition to the above first and third technical benefits achieved by the image processing apparatus 1 of the first embodiment.

If the frame image is captured in the specific situation where the road surface is wet due to rain or another factor during night-time, the percentage of a dark region in the frame image becomes higher. Usually, the amount of noise included in the dark region in the frame image is likely to be larger than that in the other brighter region in the frame image.

From this viewpoint, the image processing apparatus of the fourth embodiment is configured to change the operation mode of the image processing apparatus 1 from the normal operation mode to the specific operation mode upon determination that the histogram has first and second separate local crests, thus increasing the second noise-reduction performance level in the specific operation mode to be higher than the first noise-reduction performance level in the normal operation mode. This configuration of the image processing apparatus of the fourth embodiment increases the second noise-reduction performance level to be higher than the first noise-reduction performance level for the normal operation mode while the road surface is wet during night-time. This therefore achieves the sixth technical benefit that makes it possible to reduce the amount of noise included in a dark region in the obtained frame image.

Fifth Embodiment

Figure 7D:
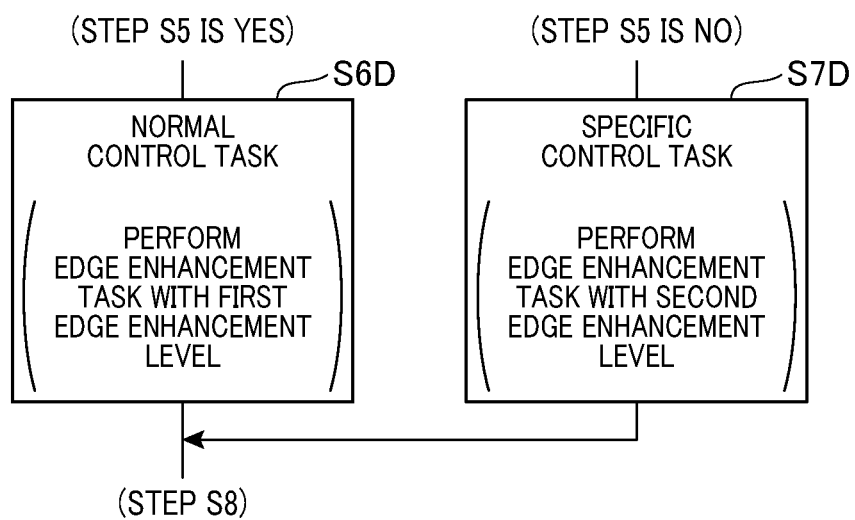
FIG. 7D is a flowchart schematically illustrating a part of a recognition routine according to the fifth embodiment of the present disclosure.

The following describes an image processing apparatus according to the fifth embodiment of the present disclosure with reference to FIG. 7D. The configuration and functions of the image processing apparatus according to the fifth embodiment are mainly different from those of the image processing apparatus 1 according to the first embodiment by the following points. The following therefore mainly describes the different points.

The difference between the normal control task and the specific control task according to the first embodiment is whether to carry out the automatic white balancing.

In contrast, the CPU 3 of the image processing apparatus of the fifth embodiment serves as, for example, the image processing unit 9 to perform the normal control task including an edge enhancement task having a predetermined first edge enhancement level for enhancing, based on the first edge enhancement level, edges extracted in the digital frame image in the normal operation mode in step S6D of FIG. 7D.

The CPU 3 of the image processing apparatus of the fifth embodiment also serves as, for example, the image processing unit 9 to perform the specific control task including the edge enhancement task having a predetermined second edge enhancement level for enhancing, based on the second edge enhancement level, edges extracted in the digital frame image in the specific operation mode in step S7D of FIG. 7D.

The edge enhancement task is configured to enhance the pixel-value difference in each extracted edge in the digital frame image; each edge represents a corresponding portion in a digital frame image where one of adjacent pixel values in respective adjacent pixels changes sharply as compared with the other of the adjacent pixel values.

The first edge enhancement level in the normal operation mode determines a first value of the enhanced pixel-value difference in each extracted edge, and the second edge enhancement level in the specific operation mode determines a second value of the enhanced pixel-value difference in each extracted edge; the second value of the enhanced pixel-value difference is smaller than the first value of the enhanced pixel-value difference.

That is, the CPU 3 is configured to apply, in the normal operation mode, the noise reduction task to each extracted edge of an input frame image obtained as the digital frame image in step S1 based on the first edge enhancement level to thereby generate an output frame image in which each edge in the digital frame image has been enhanced.

In contrast, the CPU 3 is configured to apply, in the specific operation mode, the noise reduction task to each extracted edge of an input frame image obtained as the digital frame image in step S1 based on the second edge enhancement level to thereby generate an output frame image in which each edge in the digital frame image has been enhanced; the enhanced level of each edge in the specific operation mode is smaller than the enhanced level of the corresponding edge in the normal operation mode.

The image processing apparatus of the fifth embodiment described above achieves the following seventh technical benefit in addition to the above first and third technical benefits achieved by the image processing apparatus 1 of the first embodiment.

If the frame image is captured in the specific situation where the road surface is wet due to rain or another factor during night-time, reflection light components from tail reflectors may excessively appear in the frame image.

From this viewpoint, the image processing apparatus of the fifth embodiment is configured to change the operation mode of the image processing apparatus 1 from the normal operation mode to the specific operation mode upon determination that the histogram has first and second separate local crests, thus reducing the second edge enhancement level to be lower than the first edge enhancement level for the normal operation mode.

This configuration of the image processing apparatus of the fifth embodiment reduces the second edge enhancement level, in the specific operation mode to be lower than the first edge enhancement level in the normal operation mode while the road surface is wet during night-time. This therefore achieves the seventh technical benefit that makes it possible to prevent reflection light components from tail reflectors from excessively appearing in the frame image.

Sixth Embodiment

Figure 7E:
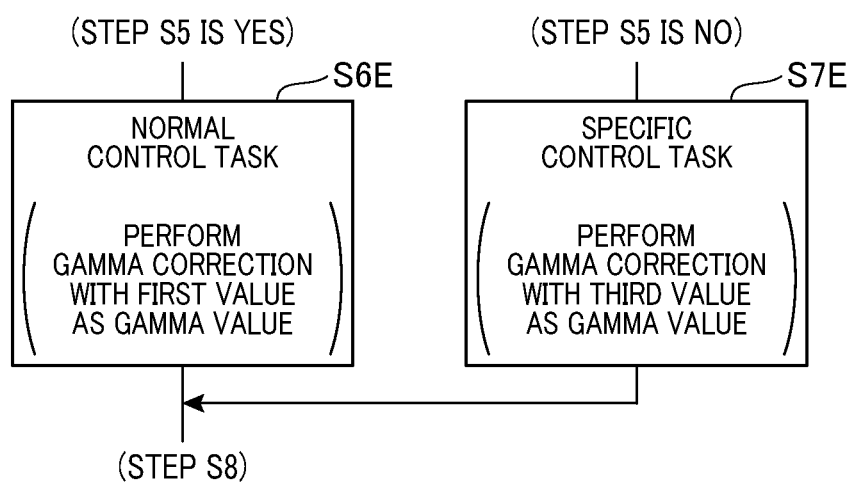
FIG. 7E is a flowchart schematically illustrating a part of a recognition routine according to the sixth embodiment of the present disclosure.

The following describes an image processing apparatus according to the sixth embodiment of the present disclosure with reference to FIG. 7E. The configuration and functions of the image processing apparatus according to the sixth embodiment are mainly different from those of the image processing apparatus 1 according to the first embodiment by the following points. The following therefore mainly describes the different points.

The difference between the normal control task and the specific control task according to the first embodiment is whether to carry out the automatic white balancing.

In contrast, the CPU 3 of the image processing apparatus of the fourth embodiment serves as, for example, the image processing unit 9 to perform the normal control task including the gamma correction having the first correlation of each of gamma-corrected pixel values to a corresponding original pixel value in the normal operation mode in step S6E of FIG. 7E.

The CPU 3 of the image processing apparatus of the sixth embodiment also serves as, for example, the image processing unit 9 to perform the specific control task including the gamma correction having a third correlation, i.e. a third ratio, of each of gamma-corrected pixel values to a corresponding original pixel value in the specific operation mode in step S7E of FIG. 7E; the first correlation is different from the third correlation.

The normal control task of the sixth embodiment is configured to apply the gamma correction to each pixel value of an input frame image obtained as the digital frame image in step S1, to which the gamma correction has not been applied, to thereby generate a corresponding gamma-corrected pixel value of an output frame image such that the first correlation, i.e. the gamma value, of each of the gamma-corrected pixel values to the corresponding original pixel value is mapped in the predetermined gamma curve GC1 as illustrated in FIG. 7. Note that the normal control task can be configured not to perform the gamma correction of the input frame image.

In contrast, the specific control task of the sixth embodiment is configured to apply the gamma correction to each pixel value of an input frame image obtained as the digital frame image in step S1, to which the gamma correction has not been applied, to thereby generate a corresponding gamma-corrected pixel value of an output frame image such that the third correlation of each of the gamma-corrected pixel values to the corresponding original pixel value is mapped in a predetermined gamma curve GC3, which is a substantially a convex downward curve, as illustrated in FIG. 7. That is, the third correlation of the gamma-corrected pixel value of each pixel in the corrected output frame image to the original pixel value of the corresponding pixel in the input frame image in the gamma curve GC3 is set to be lower than 1.

This therefore results in the pixel value of each pixel of the digital frame image, which has been subjected to the specific control task, being lower than the pixel value of the corresponding pixel of the digital frame image, which has been subjected to the normal control task.

Assuming that the total region of the pixels in the digital frame image are divided in half into the lower pixel-value region and the higher pixel-value region, the specific control task results in many levels of gray to be allocated to the higher pixel-value region as compared with the lower pixel-value region, although the normal control task results in the levels of gray are equally allocated to the lower pixel-value region and the higher pixel-value region.

The image processing apparatus of the sixth embodiment described above achieves the following eighth technical benefit in addition to the above first and third technical benefits achieved by the image processing apparatus 1 of the first embodiment.

If the frame image is captured in the specific situation where the road surface is wet due to rain or another factor during night-time, it is difficult to recognize white lane markers in a puddle on the road surface. Pixel values of the white lane markers in the digital frame image become higher.

From this viewpoint, the image processing apparatus of the sixth embodiment is configured to change or shift the operation mode of the image processing apparatus 1 from the normal operation mode to the specific operation mode upon determination that the histogram has first and second separate local crests, thus performing the gamma correction of the specific control task. That is, because the histogram has first and second separate local crests, the frame image is likely to be captured while the road surface is wet during night-time.

This configuration of the image processing apparatus of the sixth embodiment shifts the operation mode of the image processing apparatus 1 from the normal operation mode to the specific operation mode while the road surface is wet during night-time. This enables many levels of gray to be allocated to the higher pixel-value region as compared with the lower pixel-value region, although the normal control task results in the levels of gray are equally allocated to the lower pixel-value region and the higher pixel-value region.

This therefore achieves the eighth technical benefit that makes it possible to reliably recognize white lane markers in a puddle on the road surface.

Modifications

The exemplary embodiments of the present disclosure have been described, but the present disclosure is not limited to the above exemplary embodiments, and can be variably modified.

The normal control task can be configured to perform the automatic white balancing of the digital frame image using a predetermined standard color temperature of standard ambient light; the standard color temperature is stored in the memory 5.

The image processing apparatuses and image processing methods described in the present disclosure can be implemented by a dedicated computer including a memory and a processor programmed to perform one or more functions embodied by one or more computer programs.

The image processing apparatuses and image processing methods described in the present disclosure can also be implemented by a dedicated computer including a processor comprised of one or more dedicated hardware logic circuits.

The image processing apparatuses and image processing methods described in the present disclosure can further be implemented by a processor system comprised of a memory, a processor programmed to perform one or more functions embodied by one or more computer programs, and one or more hardware logic circuits.

The one or more programs can be stored in a non-transitory storage medium as instructions to be carried out by a computer or a processor. One or more functions included in each of the image processing apparatuses disclosed in the present disclosure can be implemented by one or more programmed logic circuits, one or more hardwired logic circuits, and/or one or more hardwired-logic and programmable-logic hybrid circuits.

The functions of one element in each embodiment can be distributed as plural elements, and the functions that plural elements have can be combined into one element. At least part of the structure of each embodiment can be replaced with a known structure having the same function as the at least part of the structure of the corresponding embodiment. A part of the structure of each embodiment can be eliminated. All aspects included in the technological ideas specified by the language employed by the claims constitute embodiments of the present disclosure.

The present disclosure can be implemented by various embodiments in addition to the image processing apparatus; the various embodiments include systems each including the image processing apparatus, programs for serving a computer as the image processing apparatus, storage media, such as non-transitory storage media, storing the programs, image processing methods, and cruise assist methods.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An image processing apparatus comprising:
   an image obtaining unit configured to obtain, from a vehicular camera, an image captured by the vehicular camera based on a predetermined imaging condition, the image being comprised of pixels each having a luminance level, and including a road-surface region corresponding to a road surface;
   an image processing unit configured to execute an image-processing task of the image obtained by the image obtaining unit;
   a histogram generation unit configured to generate a histogram based on the luminance values of the pixels included in the road-surface region in the image, the histogram graphically representing a frequency of each of the luminance values of the pixels included in the road-surface region in the image;
   a histogram determination unit configured to determine whether the histogram has first and second separate crests; and
   a change unit configured to change, upon determination that the histogram has first and second separate crests, the imaging condition of the vehicular camera, wherein
   the changing unit is configured to change the imaging condition of the vehicular camera to thereby increase a dynamic range of a next image to be captured by the vehicular camera upon determination that the histogram has first and second separate crests.

2. The image processing apparatus according to claim 1, wherein:
   the histogram determination unit is configured to determine that the image is captured by the vehicular camera in a specific situation where the road surface is wet during night-time upon determination that the histogram has first and second separate crests.

3. The image processing apparatus according to claim 2, wherein:
   the change unit is configured to change, upon determination that the histogram has first and second separate crests, the imaging condition of the vehicular camera to thereby cause the changed imaging condition to be suitable for a characteristic of the image captured in the specific situation.

4. An image processing apparatus comprising:
   an image obtaining unit configured to obtain, from a vehicular camera, an image captured by the vehicular camera based on a predetermined imaging condition, the image being comprised of pixels each having a luminance level, and including a road-surface region corresponding to a road surface;

an image processing unit configured to execute an image-processing task of the image obtained by the image obtaining unit;

a histogram generation unit configured to generate a histogram based on the luminance values of the pixels included in the road-surface region in the image, the histogram graphically representing a frequency of each of the luminance values of the pixels included in the road-surface region in the image;

a histogram determination unit configured to determine whether the histogram has first and second separate crests; and a change unit configured to change, upon determination that the histogram has first and second separate crests, at least one of:
the imaging condition of the vehicular camera; and
the image-processing task to be executed by the image processing unit, wherein:

the image processing unit is configured to execute, as the image-processing task of the image obtained by the image obtaining unit, automatic white balancing of the luminance value of each pixel included in the road-surface region; and the changing unit is configured to stop execution of the automatic white balance by the image processing unit upon determination that the histogram has first and second separate crests.

5. An image processing apparatus comprising:

an image obtaining unit configured to obtain, from a vehicular camera, an image captured by the vehicular camera based on a predetermined imaging condition, the image being comprised of pixels each having a luminance level, and including a road-surface region corresponding to a road surface;

an image processing unit configured to execute an image-processing task of the image obtained by the image obtaining unit;

a histogram generation unit configured to generate a histogram based on the luminance values of the pixels included in the road-surface region in the image, the histogram graphically representing a frequency of each of the luminance values of the pixels included in the road-surface region in the image;

a histogram determination unit configured to determine whether the histogram has first and second separate crests; and a change unit configured to change, upon determination that the histogram has first and second separate crests, at least one of:
the imaging condition of the vehicular camera; and
the image-processing task to be executed by the image processing unit, wherein:

the image processing unit is configured to execute, as the image-processing task of the image obtained by the image obtaining unit, gamma correction of the luminance value of each pixel included in the road-surface region; and the changing unit is configured to increase a ratio of a gamma-corrected luminance value of each pixel included in the road-surface region in the image to the luminance value of the corresponding pixel included in the road-surface region in the image upon determination that the histogram has first and second separate crests.

6. An image processing apparatus comprising:

an image obtaining unit configured to obtain, from a vehicular camera, an image captured by the vehicular camera based on a predetermined imaging condition, the image being comprised of pixels each having a luminance level, and including a road-surface region corresponding to a road surface;

an image processing unit configured to execute an image-processing task of the image obtained by the image obtaining unit;

a histogram generation unit configured to generate a histogram based on the luminance values of the pixels included in the road-surface region in the image, the histogram graphically representing a frequency of each of the luminance values of the pixels included in the road-surface region in the image;

a histogram determination unit configured to determine whether the histogram has first and second separate crests; and a change unit configured to change, upon determination that the histogram has first and second separate crests, at least one of:
the imaging condition of the vehicular camera; and
the image-processing task to be executed by the image processing unit, wherein:

the image processing unit is configured to execute, as the image-processing task of the image obtained by the image obtaining unit, a noise reduction task of the image, the noise reduction task having a predetermined noise-reduction performance level for removing an amount of noise from the image; and the changing unit is configured to increase the noise-reduction performance level upon determination that the histogram has first and second separate crests.

7. An image processing apparatus comprising:

an image obtaining unit configured to obtain, from a vehicular camera, an image captured by the vehicular camera based on a predetermined imaging condition, the image being comprised of pixels each having a luminance level, and including a road-surface region corresponding to a road surface;

an image processing unit configured to execute an image-processing task of the image obtained by the image obtaining unit;

a histogram generation unit configured to generate a histogram based on the luminance values of the pixels included in the road-surface region in the image, the histogram graphically representing a frequency of each of the luminance values of the pixels included in the road-surface region in the image;

a histogram determination unit configured to determine whether the histogram has first and second separate crests; and a change unit configured to change, upon determination that the histogram has first and second separate crests, at least one of:
the imaging condition of the vehicular camera; and
the image-processing task to be executed by the image processing unit, wherein:

the image processing unit is configured to execute, as the image-processing task of the image obtained by the image obtaining unit, an edge enhancement task having a predetermined edge enhancement level for enhancing, based on the edge enhancement level, at least one edge extracted in the image; and the changing unit is configured to reduce the edge enhancement level upon determination that the histogram has first and second separate crests.

8. The image processing apparatus according to claim 5, wherein:

the changing unit is configured to reduce the ratio of a gamma-corrected luminance value of each pixel included in the road-surface region in the image to the luminance value of the corresponding pixel included in the road-surface region in the image upon determination that the histogram has first and second separate crests.

9. The image processing apparatus according to claim 1, wherein:
the image obtaining unit is configured to obtain continuous frame images as the image from the vehicular camera;
the change unit is configured to change, upon determination that the histogram has first and second separate crests based on one of the frame images, at least one of:
the imaging condition of the vehicular camera from a normal imaging condition to a specific imaging condition; and
the image-processing task to be executed by the image processing unit from a normal image-processing task to a specific image-processing task,
the image processing apparatus further comprising:
a return unit configured to perform at least one of:
a first return task of returning the specific imaging condition to the normal imaging condition upon determination that the histogram based on each of a predetermined number of frame images after change of the imaging condition to the specific imaging condition does not have first and second separate crests; and
a second return task of returning the specific processing image-processing task to the normal image-processing task upon determination that the histogram based on each of the predetermined number of frame images after change of the image-processing task to the specific image-processing task does not have first and second separate crests.

10. The image processing apparatus according to claim 4, wherein:
the histogram determination unit is configured to determine that the image is captured by the vehicular camera in a specific situation where the road surface is wet during night-time upon determination that the histogram has first and second separate crests.

11. The image processing apparatus according to claim 10, wherein:
the change unit is configured to change, upon determination that the histogram has first and second separate crests, at least one of the imaging condition of the vehicular camera, and the automatic white balancing to be executed by the image processing unit to thereby cause at least one of:
the changed imaging condition to be suitable for a characteristic of the image captured in the specific situation; and
the changed automatic white balancing to be suitable for the characteristic of the image captured in the specific situation.

12. The image processing apparatus according to claim 4, wherein:
the image obtaining unit is configured to obtain continuous frame images as the image from the vehicular camera;
the change unit is configured to change, upon determination that the histogram has first and second separate crests based on one of the frame images, at least one of:
the imaging condition of the vehicular camera from a normal imaging condition to a specific imaging condition; and
the automatic white balancing to be executed by the image processing unit from a normal automatic white balancing image-processing task to a specific automatic white balancing,
the image processing apparatus further comprising:
a return unit configured to perform at least one of:
a first return task of returning the specific imaging condition to the normal imaging condition upon determination that the histogram based on each of a predetermined number of frame images after change of the imaging condition to the specific imaging condition does not have first and second separate crests; and
a second return task of returning the specific automatic white balancing to the normal automatic white balancing upon determination that the histogram based on each of the predetermined number of frame images after change of the automatic white balancing to the specific automatic white balancing does not have first and second separate crests.

13. The image processing apparatus according to claim 5, wherein:
the histogram determination unit is configured to determine that the image is captured by the vehicular camera in a specific situation where the road surface is wet during night-time upon determination that the histogram has first and second separate crests.

14. The image processing apparatus according to claim 5, wherein:
the change unit is configured to change, upon determination that the histogram has first and second separate crests, at least one of the imaging condition of the vehicular camera, and the gamma correction to be executed by the image processing unit to thereby cause at least one of:
the changed imaging condition to be suitable for a characteristic of the image captured in the specific situation; and
the changed gamma correction to be suitable for the characteristic of the image captured in the specific situation.

15. The image processing apparatus according to claim 5, wherein:
the image obtaining unit is configured to obtain continuous frame images as the image from the vehicular camera;
the change unit is configured to change, upon determination that the histogram has first and second separate crests based on one of the frame images, at least one of:
the imaging condition of the vehicular camera from a normal imaging condition to a specific imaging condition; and
the gamma correction to be executed by the image processing unit from a normal gamma correction to a specific gamma correction,
the image processing apparatus further comprising:
a return unit configured to perform at least one of:
a first return task of returning the specific imaging condition to the normal imaging condition upon determination that the histogram based on each of a predetermined number of frame images after change of the imaging condition to the specific imaging condition does not have first and second separate crests; and a second return task of returning the specific gamma correction to the normal gamma correction upon determination that the histogram based on each of the predetermined number of frame images after change of the gamma correction to the specific gamma correction does not have first and second separate crests.

16. The image processing apparatus according to claim 6, wherein:
the histogram determination unit is configured to determine that the image is captured by the vehicular camera in a specific situation where the road surface is wet during night-time upon determination that the histogram has first and second separate crests.

17. The image processing apparatus according to claim 6, wherein:
the change unit is configured to change, upon determination that the histogram has first and second separate crests, at least one of the imaging condition of the vehicular camera, and the noise reduction task to be executed by the image processing unit to thereby cause at least one of:
the changed imaging condition to be suitable for a characteristic of the image captured in the specific situation; and
the changed noise reduction task to be suitable for the characteristic of the image captured in the specific situation.

18. The image processing apparatus according to claim 6, wherein:
the image obtaining unit is configured to obtain continuous frame images as the image from the vehicular camera;
the change unit is configured to change, upon determination that the histogram has first and second separate crests based on one of the frame images, at least one of:
the imaging condition of the vehicular camera from a normal imaging condition to a specific imaging condition; and
the noise reduction task to be executed by the image processing unit from a normal noise reduction task to a specific noise reduction task,
the image processing apparatus further comprising:
a return unit configured to perform at least one of:
a first return task of returning the specific imaging condition to the normal imaging condition upon determination that the histogram based on each of a predetermined number of frame images after change of the imaging condition to the specific imaging condition does not have first and second separate crests; and
a second return task of returning the specific noise reduction task to the normal noise reduction task upon determination that the histogram based on each of the predetermined number of frame images after change of the noise reduction task to the specific noise reduction task does not have first and second separate crests.

19. The image processing apparatus according to claim 7, wherein:
the histogram determination unit is configured to determine that the image is captured by the vehicular camera in a specific situation where the road surface is wet during night-time upon determination that the histogram has first and second separate crests.

20. The image processing apparatus according to claim 7, wherein:
the change unit is configured to change, upon determination that the histogram has first and second separate crests, at least one of the imaging condition of the vehicular camera, and the edge enhancement task to be executed by the image processing unit to thereby cause at least one of:
the changed imaging condition to be suitable for a characteristic of the image captured in the specific situation; and
the changed edge enhancement task to be suitable for the characteristic of the image captured in the specific situation.

21. The image processing apparatus according to claim 7, wherein:
the image obtaining unit is configured to obtain continuous frame images as the image from the vehicular camera;
the change unit is configured to change, upon determination that the histogram has first and second separate crests based on one of the frame images, at least one of:
the imaging condition of the vehicular camera from a normal imaging condition to a specific imaging condition; and
the edge enhancement task to be executed by the image processing unit from a normal edge enhancement task to a specific edge enhancement task,
the image processing apparatus further comprising:
a return unit configured to perform at least one of:
a first return task of returning the specific imaging condition to the normal imaging condition upon determination that the histogram based on each of a predetermined number of frame images after change of the imaging condition to the specific imaging condition does not have first and second separate crests; and
a second return task of returning the specific edge enhancement task to the normal edge enhancement task upon determination that the histogram based on each of the predetermined number of frame images after change of the edge enhancement task to the specific edge enhancement task does not have first and second separate crests.

* * * * *

(12) SUPPLEMENTAL EXAMINATION CERTIFICATE

United States Patent
Kobayashi, Kazuhiko

(10) Number: US 11,417,083 F1
(45) Certificate Issued: Mar. 13, 2023

Control No.: 96/000,419

Filing Date: Jan. 19, 2023

Primary Examiner: Colin LaRose

No substantial new question of patentability is raised in the request for supplemental examination. See the Reasons for Substantial New Question of Patentability Determination in the file of this proceeding.

(56) Items of Information

FOREIGN PATENT DOCUMENTS

| | | |
|---|---|---|
| JP | 2002-135648A | 5/2002 |
| JP | 2015-179482A | 8/2015 |
| JP | 2018-201156A | 12/2018 |
| JP | 2019-033470A | 2/2019 |

OTHER DOCUMENTS

Aoki, Yasushi, "Image Processing that also Elucidates the Laws of Nature; Research and Development of Snow Sensors by Image Processing," Eizojoho Industrial, March 2007, pp. 63-69.